(12) United States Patent
Meier et al.

(10) Patent No.: US 7,575,206 B2
(45) Date of Patent: Aug. 18, 2009

(54) VEHICLE SEAT WITH AUTOMATIC HEIGHT ADJUSTMENT AND METHOD THEREFORE

(75) Inventors: Johann Meier, Fensterbach (DE); Thomas Burger, Lubburg (DE); Marco Hofmann, Hahnbach (DE)

(73) Assignee: Grammer AG, Amberg (DE)

( * ) Notice: Subject to any disclaimer, the term of this patent is extended or adjusted under 35 U.S.C. 154(b) by 574 days.

(21) Appl. No.: 10/994,134

(22) Filed: Nov. 19, 2004

(65) Prior Publication Data

US 2005/0110243 A1 May 26, 2005

(30) Foreign Application Priority Data

Nov. 22, 2003 (DE) ................. 103 54 635

(51) Int. Cl.
*A47C 1/00* (2006.01)
(52) U.S. Cl. ........................ 248/161; 248/157; 248/421; 297/344.12
(58) Field of Classification Search ................. 248/161, 248/157, 421; 297/344.12, 344.15, 344.16, 297/344.17, 344.19
See application file for complete search history.

(56) References Cited

U.S. PATENT DOCUMENTS 4,638,982 A 1/1987 Misher et al. ................ 267/131

(Continued)

FOREIGN PATENT DOCUMENTS

DE 3312732 10/1984

(Continued)

OTHER PUBLICATIONS

European Search Report in European Patent Application No. EP 04105532.8 dated Oct. 24, 2007.

(Continued)

*Primary Examiner*—Korie Chan
*Assistant Examiner*—Steven Marsh
(74) *Attorney, Agent, or Firm*—Ballard Spahr Andrews & Ingersoll, LLP

(57) ABSTRACT

The invention relates to a vehicle seat comprising at least one gas spring (9) which damps vibration and adjusts the seat height, said gas spring being arranged between a seat frame (1) and a base frame (2), and comprising a valve arrangement (43, 44) for adjusting the pressure in the gas spring (9) and a compressor (45) assigned to the vehicle seat (17, 20, 23), said compressor having a drive motor for feeding compressed gas to the gas spring (9), wherein a belt roller device comprising a belt (11) rolled around an axle (12) is arranged between the seat frame (1) and the base frame (2), the first end (11*a*) of said belt being attached to a belt roller mechanism (10) arranged on the seat frame (1) and the second end (11*b*) of said belt being attached to the base frame (2), and a detector (16) which detects a belt rolling movement is attached to the seat frame (1). Use is made of an electronic control unit (14, 38, 40) for evaluating belt rolling movement signals detected within a predefined time period (26, 27, 29) for determining a seat height profile within the time period (26, 27, 29) and for controlling the valve arrangement (43, 44) and/or the compressor (45) such that automatic, time-delayed seat height re-adjustment takes place if the seat height profile (31, 35) determined for the time period (26, 27, 29) lies out of a position of symmetry in relation to a predefinable mean seat height (28). Also disclosed is a method for carrying out such automatic seat height adjustment.

10 Claims, 6 Drawing Sheets

U.S. PATENT DOCUMENTS

| | | | |
|---|---|---|---|
| 5,058,852 A | * 10/1991 | Meier et al. | 248/588 |
| 5,169,112 A | * 12/1992 | Boyles et al. | 248/550 |
| 5,570,866 A | * 11/1996 | Stephens | 248/631 |
| 5,651,585 A | * 7/1997 | Van Duser | 297/344.16 |
| 6,264,163 B1 | * 7/2001 | Ivarsson | 248/588 |

FOREIGN PATENT DOCUMENTS

| | | |
|---|---|---|
| DE | 4003781 | 10/1990 |
| DE | 4025183 | 11/1991 |
| DE | 41 16 483 | 11/1992 |
| DE | 4228061 | 2/1994 |

OTHER PUBLICATIONS

Office Action in corresponding application in China, No. 200410097619.5 and English translation thereof.

* cited by examiner

VEHICLE SEAT WITH AUTOMATIC HEIGHT ADJUSTMENT AND METHOD THEREFORE

This application claims priority to German Application No. 103 54 635.9, filed Nov. 22, 2003, which is herein incorporated by reference.

The invention relates to a vehicle seat comprising at least one gas spring which damps vibration and adjusts the seat height, said gas spring being arranged between a seat frame and a base frame, and comprising a valve arrangement for adjusting the pressure in the gas spring and a compressor assigned to the vehicle seat, said compressor having a drive motor for feeding compressed gas to the gas spring, according to the preamble of Patent Claim 1. A belt roller device comprising a belt rolled around an axle is arranged between the seat frame and the base frame, the first end of said belt being attached to a belt roller mechanism arranged on the seat frame and the second end of said belt being attached to the base frame. A belt rolling movement is detected by a detector which is attached to the seat frame. The invention furthermore relates to a method for automatic height adjustment.

Such a vehicle seat is known from DE 40 25 183 C1. Said document describes, in connection with such a vehicle seat, the use of a compressor and of a drive motor for the compressor, which are provided directly on the vehicle seat. A pressure-system-autonomous vehicle seat is thus provided which can be installed in any vehicle. It is thus not necessary for the vehicle which is to be fitted with the vehicle seat to have a dedicated pressure source. In addition, the valve arrangement used comprises a 2/2-way valve, which is used only to let air out of the gas spring, and a 3/2-way valve which is arranged between the gas spring and a coupling of the belt roller device.

Such vehicle seats are usually re-adjusted in terms of their height and weight loading setting by operating handles which are arranged on the vehicle seat, in order to obtain an optimal sprung system for the driver as a function of the weight of a person, the road condition, the loading of the vehicle and/or the pressure change status within the gas spring. The operation of such handles requires a driver occupying the vehicle seat to think about carrying out this operation in good time.

Accordingly, it is an object of the present invention to provide a vehicle seat with height adjustment and a method for this purpose, which vehicle seat and which method allow increased comfort for a person using the vehicle seat.

This object is achieved in terms of the device by the features of Patent Claim 1.

The core concept of the invention is that, in a vehicle seat comprising at least one gas spring which damps vibration and adjusts the seat height, said gas spring being arranged between a seat frame and a base frame, and comprising a valve arrangement for adjusting the pressure in the gas spring and a compressor assigned to the vehicle seat, said compressor having a drive motor for feeding compressed gas to the gas spring, use is made of an electronic control unit which evaluates detected signals of a belt rolling movement which relate to the movement of a belt roller mechanism and the belt thereof which is arranged between the seat frame and the base frame, for a defined time period, and controls the valve arrangement such that automatic, time-delayed seat height re-adjustment takes place. This seat height re-adjustment takes place when the seat height profile determined for the time period lies out of a position of symmetry in relation to a predefinable mean seat height.

Accordingly, based on the detected belt rolling movement signals, a seat height profile existing within the time period can be determined and the seat height profile can be analysed in terms of its position in relation to the predefined mean seat height in order to automatically carry out seat height re-adjustment in the event of a position out of the position of symmetry. Such automatic seat height re-adjustment allows increased comfort for the person occupying the seat since it is no longer necessary to additionally operate handles in order to achieve seat height re-adjustment that is appropriate for the person's weight and/or the road condition and/or the pressure change status in the gas spring and/or a change in the local weight loading by the person.

The belt roller mechanism is arranged as a belt roller device between the upper seat frame and the underlying base frame, wherein the belt rolled around an axle is attached by a first end to the belt roller mechanism, which is arranged on the seat frame, and by a second end to the base frame. A detector which detects the belt rolling movements co-operates with a magnetic tape that moves with the belt movement, which magnetic tape is preferably attached to the belt roller mechanism on a roller at the circumference. In this way, the stationary detector can detect the momentary rotary position of the belt roller or of the magnetic tape fitted thereon. This allows a determination of the belt rolling movement which runs synchronously with an upward and downward oscillating movement of the seat frame with respect to the stationary base frame.

In order to be able to carry out automatic seat height re-adjustment in the event of a change of driver, the vehicle seat has an arrangement for detecting occupancy of the seat, which arrangement transmits seat occupancy signals to the electronic control unit. The seat occupancy detection is activated automatically as soon as a new driver sits on the vehicle seat following the predefined time period, which corresponds to a minimum length of time in which the vehicle seat is unoccupied. Preferred values for the minimum length of time are 7 seconds or more.

As soon as such a minimum length of time has expired, a first actuator arrangement of the electronic control unit controls the valve arrangement and/or the compressor such that the vehicle seat is adjusted from below to the predefined mean seat height independently of the weight of the driver. The result of this is that fully automatic and precise seat height re-adjustment takes place in the event of a change of driver when at least 7 seconds have passed between the points of occupancy of the old and new drivers. If, on the other hand, the elapsed time is less than 7 seconds, this is interpreted as brief standing-up of the vehicle driver, for example in a tractor or construction machine. However, such brief standing-up does not require re-adjustment of the seat height. Accordingly, such seat height re-adjustment takes place only once the predefined minimum length of time has elapsed.

Moreover, such seat leveling always to the same predefined mean seat height regardless of the weight of the driver preferably takes place automatically while the vehicle is stationary.

According to a further preferred embodiment, the predefined time period is a maximum length of time in which during travel a weight displacement by the person occupying the vehicle seat or an undesirable pressure change within the gas spring takes place. Such a maximum length of time is about 10 seconds or less. Thus, in the event of a loss of air in an air-based gas spring, said loss of air can be compensated by corresponding re-adjustment of the seat height. A shift in the driver's weight, which may lead to a shift in the seat height profile with respect to the predefined mean seat height, can also thereby be compensated.

In order to automatically compensate such deviations from the predefined mean seat height, the electronic control unit has a second actuator arrangement. Following expiry of the maximum length of time for seat height re-adjustment, such an actuator arrangement controls the valve arrangement and/or the compressor such that a height vibration movement of the vehicle seat as seat height profile is set symmetrically around the mean seat height. That is to say that the curve of the height vibration movement is automatically shifted back from its deviant position to the level of the mean seat height.

According to a third preferred embodiment, the predefined time period may be a further length of time in which during travel the seat height profile as vibration profile of the height vibration movement of the vehicle seat is subjected to an asymmetrical shift with respect to the predefined mean seat height on account of a specific road condition and/or a manner of driving and/or a specific weight loading condition of the vehicle. For this, the electronic control unit has a third actuator arrangement which, following expiry of the further length of time, controls the valve arrangement and/or the compressor such that the predefined mean seat height is re-adjusted. The mean position of the damped vehicle seat is thus shifted upwards or downwards with respect to the previously set mean position, depending on whether an asymmetric shift of the vibration curve of the height vibration movement of the seat is oriented upwards or downwards.

In a method for automatic seat height adjustment of such a vehicle seat, according to a first step, following expiry of the predefined time period, the detected belt rolling movement signals are evaluated by means of the electronic control unit and a seat height profile within the time period is determined therefrom. In a second step, the electronic control unit controls the valve arrangement and/or the compressor such that it automatically re-adjusts the seat height in a time-delayed manner as soon as the previously determined seat height profile lies out of a position of symmetry arranged with respect to a predefined mean seat height.

Advantageously, when the vehicle is stationary, the method may include the step of automatic adjustment of the seat height when there is a change of driver. For this, the vehicle seat—that is to say the seat frame with respect to the base frame—is automatically set to the predefined mean seat height from below if no seat occupancy has been detected within the predefined time period.

Furthermore, when the vehicle is moving, the vehicle seat is automatically set to a new seat height when the vibration curve of the height vibration movement of the vehicle seat is shifted with respect to the predefined mean seat height.

Further advantageous embodiments are given in the dependent claims.

Advantages and useful features can be found in the following description in conjunction with the drawing, in which.

Figure 1:
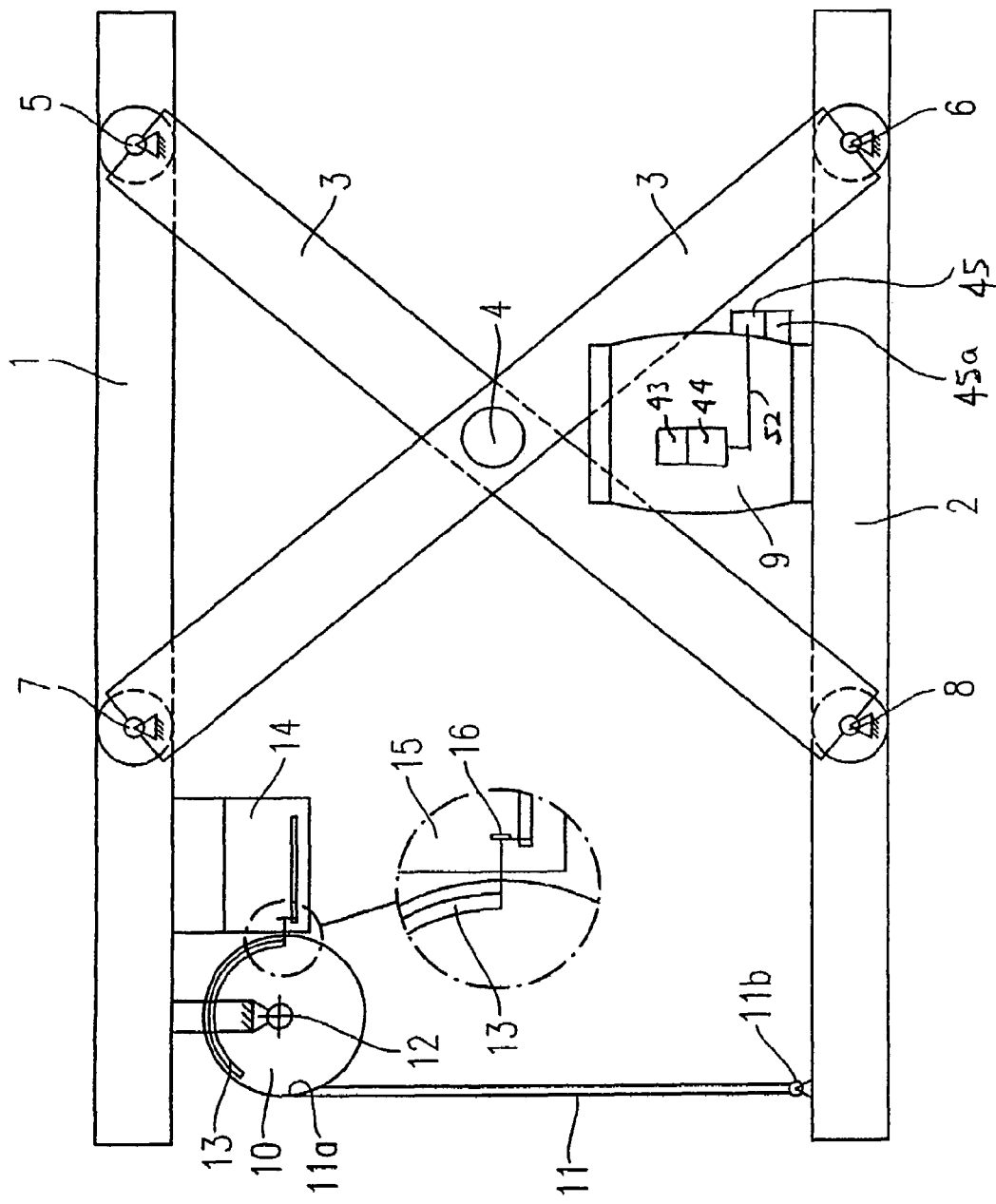
FIG. 1 shows, in a schematic cross-sectional view, essential parts of a damped vehicle seat according to one embodiment of the invention.

FIG. 1 shows essential parts of a vehicle seat. A seat frame 1 is connected to a base frame 2 via links 3 which are connected to one another in a link bracket 4. For this, fixed brackets 5 and 6 and loose brackets 7 and 8 are arranged in the seat frame 1 and base 35 frame 2.

An air spring 9 is shown schematically and is fluidically connected to a compressor 45 that can be driven by a drive motor 45a. A valve arrangement used with the gas spring 9 comprises a 2/2-way valve 43, which is used only to let air out of the gas spring 9, and a 3/2-way valve 44 connected to the compressor 45 by air line 52. The compressor 45, 45a and the valves 43, 44 are controlled by the electronic control device 14 (electrical connections not shown in FIG. 1, but are standard).

A belt roller mechanism 10 is connected to a belt 11, the upper first end 11a of which is in contact with the belt roller mechanism and the lower second end 11b of which is connected to the base frame. In this way, a change in the height or spacing of the seat frame with respect to the base frame is converted into a rotational movement of the spring-loaded belt roller mechanism, which is mounted to pivot about an axle 12.

In order to be able to detect the belt rolling movements, the roller-like belt roller mechanism 10 has a magnetic strip 13 on the circumference, the individual positions of which can be detected by a detector 16 which is fitted in a stationary manner on the seat frame and is arranged within an electronic control unit 14. This is clearly shown in the enlarged detail bearing reference 15.

Figure 2:
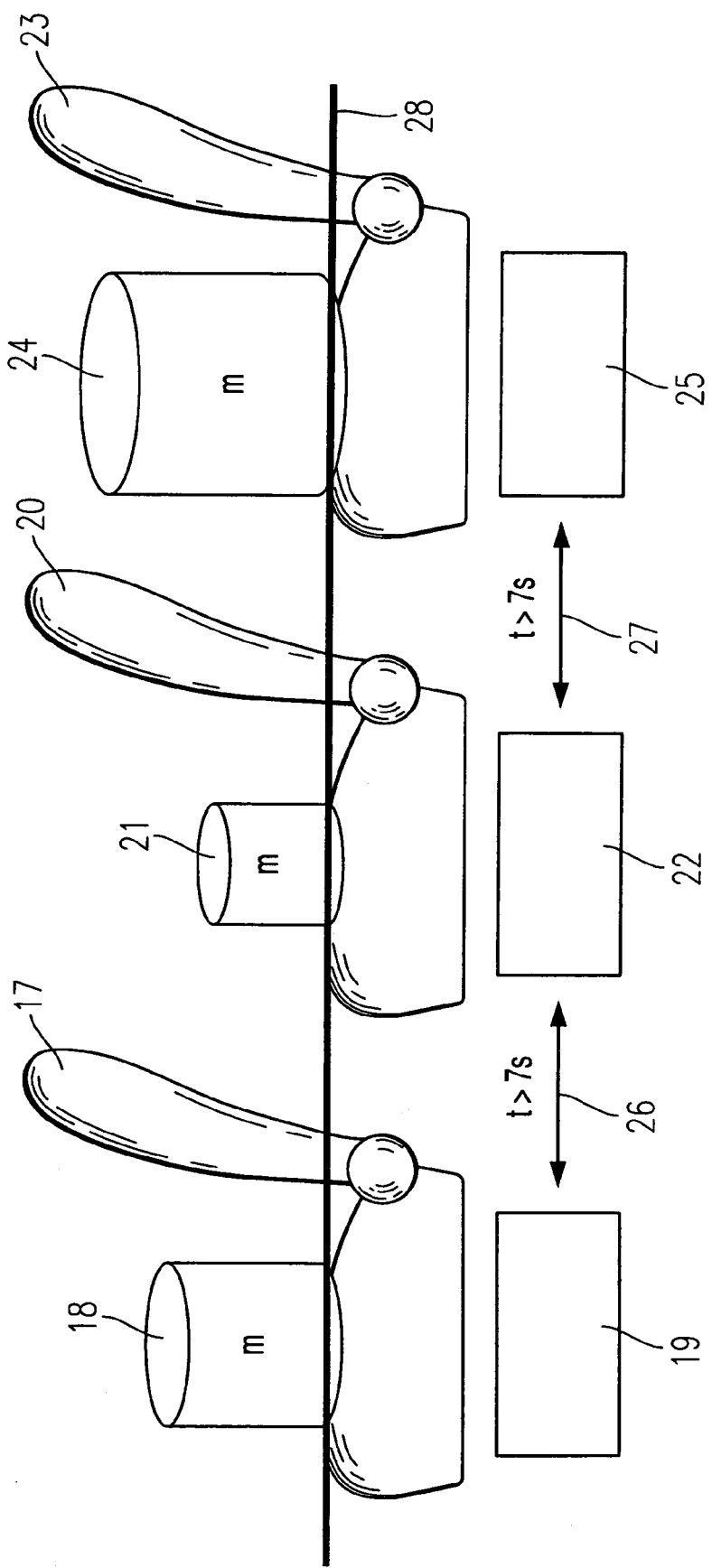
FIG. 2 shows, in the form of a schematic diagram, a vehicle seat according to a first embodiment of the invention with seat height re-adjustment following change of driver.

FIG. 2 shows the vehicle seat according to the invention after a seat height re-adjustment has been carried out following a change of driver. A vehicle seat 17 is occupied by a driver having a first weight 18. In this case, the vehicle seat has a starting distance as shown by reference 19.

Following expiry of a minimum length of time of 7 seconds (cf. reference 26), as soon as no seat occupancy is detected by an automatically activatable seat occupancy arrangement a new seat height adjustment takes place when the vehicle seat 20 is occupied once again by a driver having a lower weight 21. For this, for precise positioning of the vehicle seat with respect to a predefined level 28, the vehicle seat is moved upwards to the level 28 in a completely automatic manner.

Following expiry of a further 7 seconds (reference 27) in which no seat occupancy has been detected, when the vehicle seat 23 is occupied once again by a driver having the weight 24 the set level 28 will once again be reached automatically, independently of the weight of the driver. References 22 and 25 indicate the starting distance from the bottom upwards.

Figure 3:
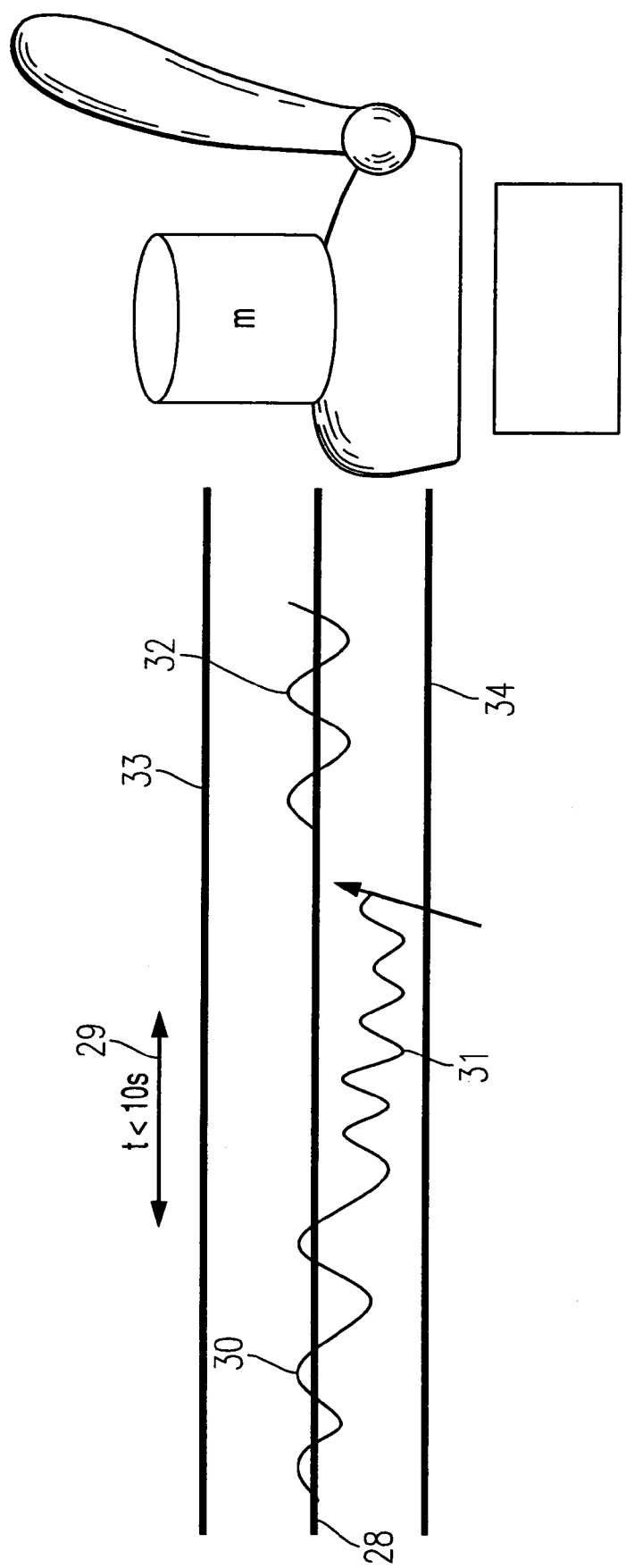
FIG. 3 shows, in the form of a schematic diagram, a vehicle seat according to second embodiment of the invention with automatic seat height readjustment following a loss of air or shift of weight within a maximum length of time.

FIG. 3 shows, in the form of a schematic diagram, a vehicle seat according to the invention with seat height re-adjustment, as is carried out when deviations from the set level 28 occur. As can be seen in FIG. 3, during travel the vibration profile of the vibration-damped vehicle seat is observed within a predefined maximum period of time 29 of at most 10 seconds. In this case, the vibration profile 30, which is initially in a position of symmetry with respect to the level 28, becomes a vibration profile 31 which is shifted with respect to the level position 28. If this shifted state, which may occur for example on account of a loss of air within the air spring system or a weight shift of the driver, lasts continually throughout the maximum period of time 29, in the case of considerable deviation the seat height will be re-adjusted, in order to once again reach a symmetrical position of the vibration curve with respect to the level 28, as shown by reference 32. The damping system also has a maximum upper and lower limit 33 and 34.

In this way, the loss of air or weight shift of the driver can be compensated.

Figure 4:
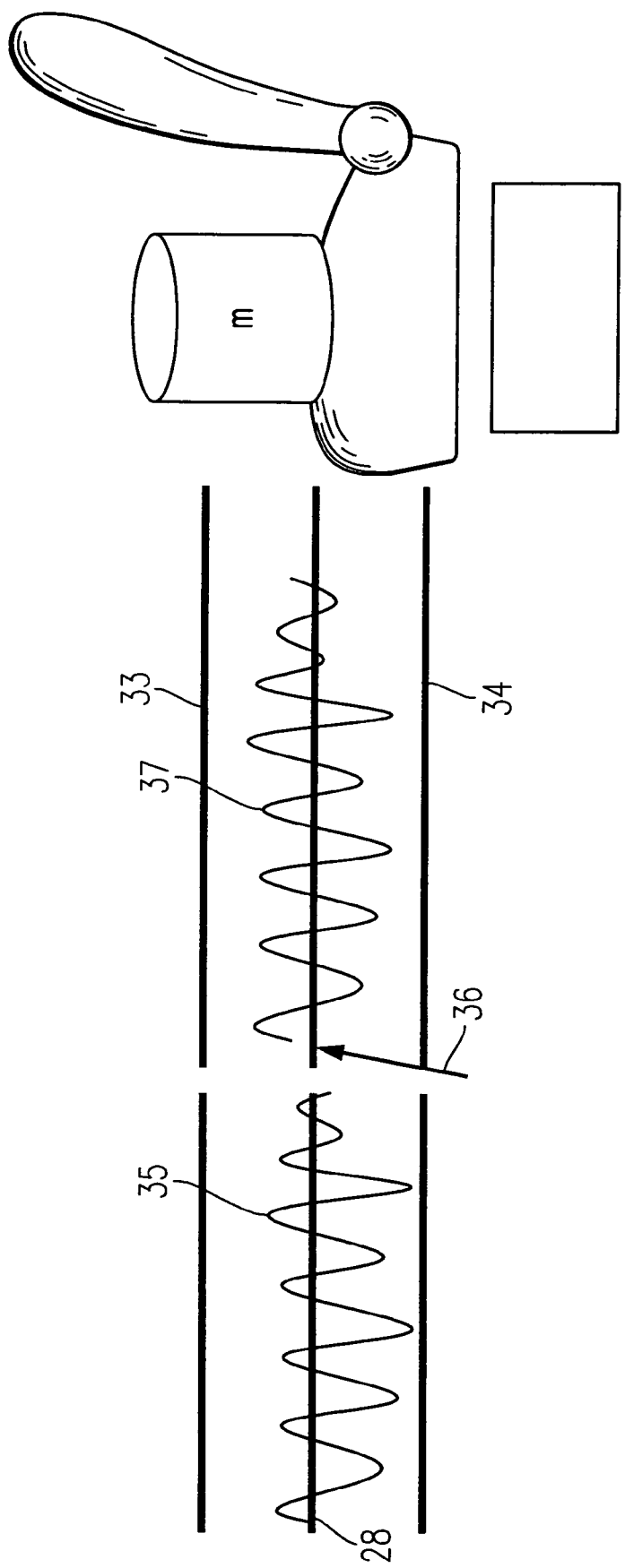
FIG. 4 shows, in the form of a schematic diagram, a vehicle seat according to a fourth embodiment of the invention with automatic seat height adjustment following an asymmetric vibration behavior.

FIG. 4 shows, in the form of a schematic diagram, a vehicle seat according to the invention with seat height re-adjustment, as takes place in the event of an asymmetric vibration behavior of the vehicle seat. As can be seen in FIG. 4, a vibration curve 35 lies asymmetrically with respect to the level 28, for example on account of travelling along a road with a large number of potholes. In this case, as shown by the arrow 36, a slight raising of the level 28 may lead to there once again being a symmetrical vibration behavior of the vehicle seat, as shown by the vibration curve 37.

Figure 5:
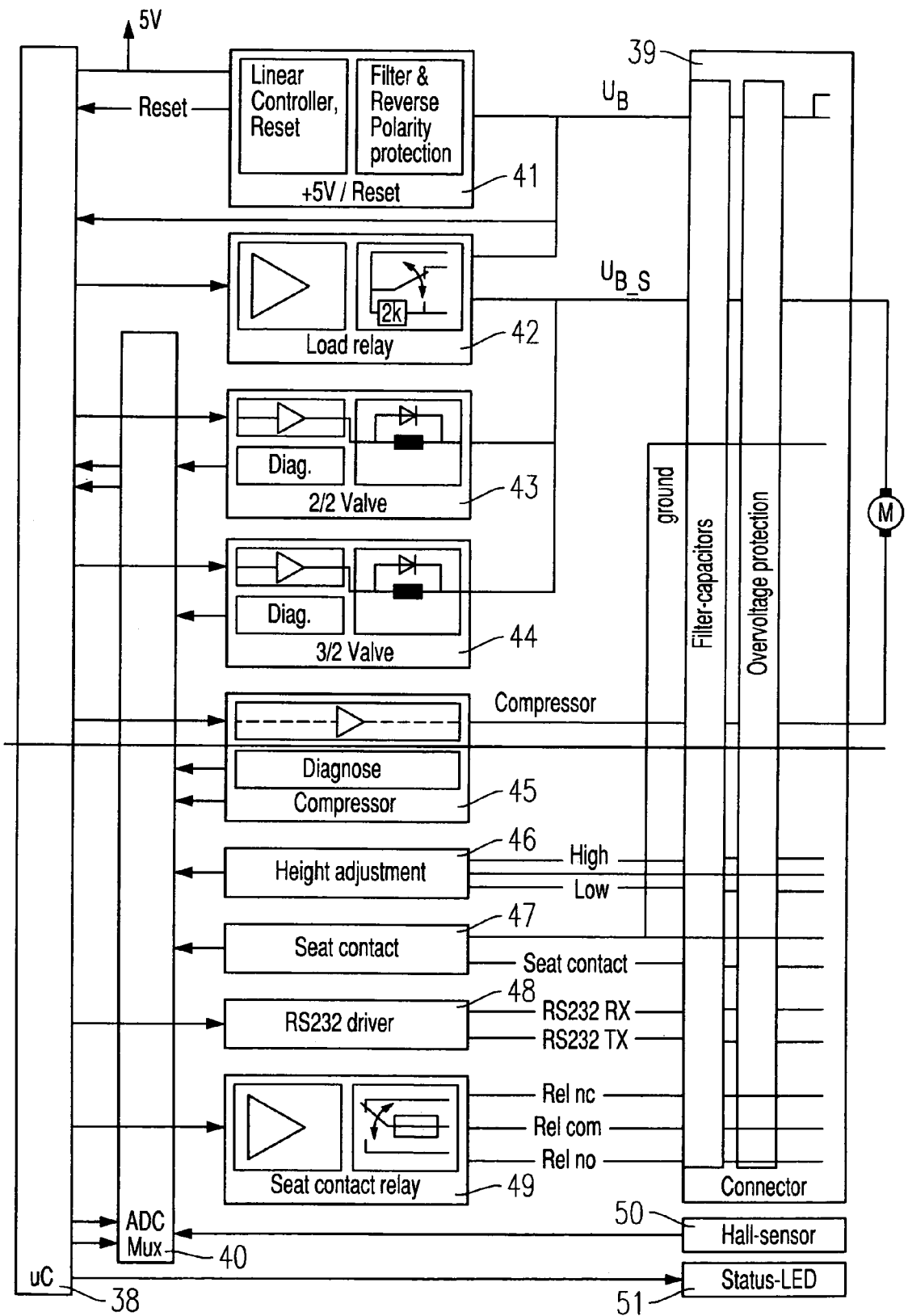
FIG. 5 shows a block diagram of the vehicle seat according to the invention.

FIG. 5 shows a block diagram of the elements of the vehicle seat according to the invention, including an electronic control unit (14 in FIG. 1) that interacts with the other elements as indicated. It can be seen from the block diagram that an electronic control unit comprising microcontroller 38 and analog/digital converter multiplexer (ADC mux) 40 is connected to a reset unit 41, a load relay 42 and a valve arrangement composed of a 2/2-way valve 43 and a 3/2-way valve 44. In addition, a compressor 45 which is assigned to the vehicle seat, an actuatable height adjustment device 46, an automatic seat occupancy detector 47, 49 with a seat contact and a seat contact relay, and a driver unit 48 are also connected to the control unit 38, 40 via a connector device 39.

Arranged next to a Hall sensor 50 is a status LED 51 for indicating the momentary status of the seat height setting.

With reference to FIG. 6, there is now shown the control of one possible seat height re-adjustment operation. Here, all the setting parameters are to be formed as variables $ which can be changed subsequently by a serial interface 45a drive motor. This should be possible in order to ensure adaptation to the various types of seat and to find the optimal basic setting.

The control is to be regarded as time-dependent and not distance-dependent, since the detector used can distinguish only between an on and off state. During a manual seat height adjustment operation, the re-adjustment control should be switched to inactive.

Figure 6A:
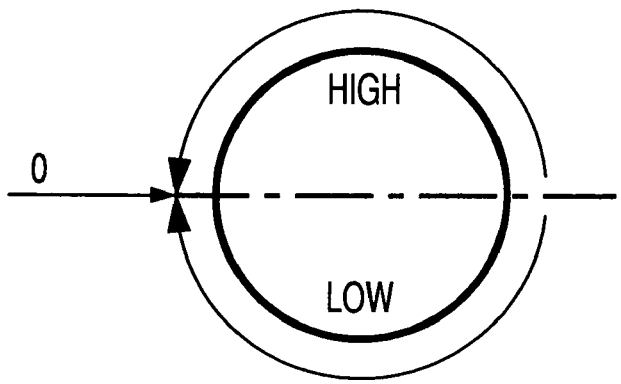
FIG. 6 shows a schematic diagram of various possible seat height re-adjustment operations.

FIG. 6a shows a zero position control 52 air line. The zero position of the control should always be crossed from below by the compressor. The control should remain inactive in a range of 0.5 seconds below and above the centre position.

Figure 6B:
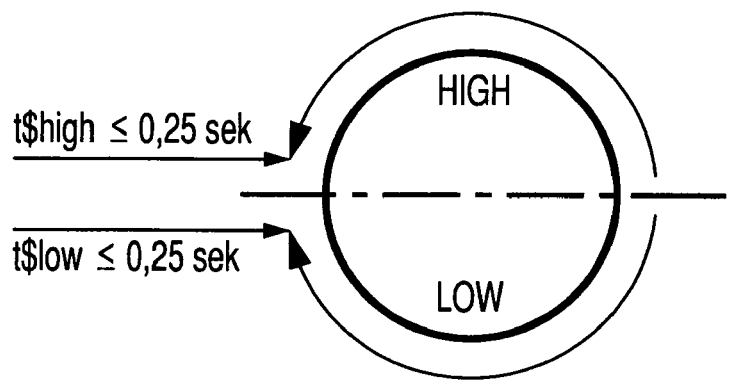

FIG. 6b shows an inactive suspension behaviour. If the control is within a range of t$high ≦0.25 seconds and t$low≦0.25 seconds, it should behave inactively in the subsequent re-adjustment.

Figure 6C:
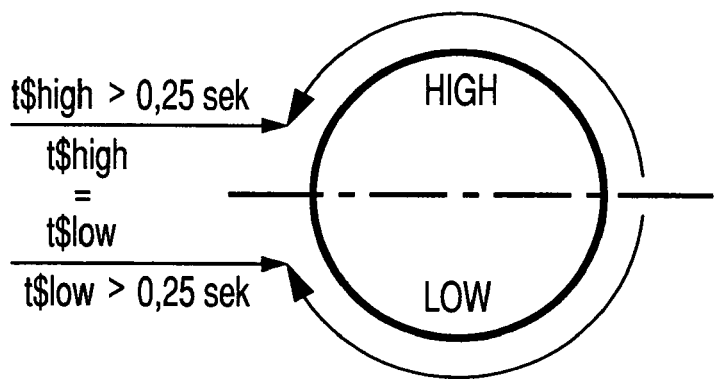

FIG. 6c shows the re-adjustment. If the control is within the range of t$high>0.25 seconds or t$low>0.25 seconds, the different values of the two should be compared. If the status of t$high=t$low, no re-adjustment is to take place.

Figure 6D:
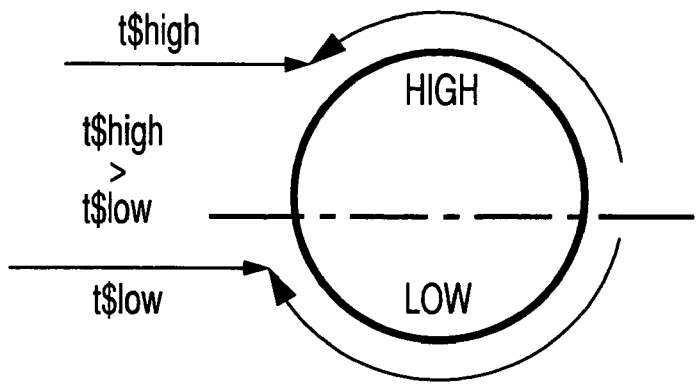

If one of the values differs from the other and reaches at least the value t$multi=2 (e.g. t$high≧t$multi=2×t$low), as shown in FIG. 6d, the control should begin with a re-adjustment if the following events have also occurred.

This status should have occurred at least 10 times within a time period of 10 seconds. The control should begin active adjustment only if all the variables have occurred.

All of the features mentioned in the description are to be regarded as essential to the invention.

LIST OF REFERENCES 1 seat frame
2 base frame
3 links
4 link bracket
5, 6 fixed bracket
7, 8 loose bracket
9 gas spring
10 belt roller mechanism
11 belt
11a first end of the belt
11b second end of the belt
12 axle
13 magnetic tape
14 electronic control unit
15 detail view
16 sensor
17, 20, 23 vehicle seat
18, 21, 24 weight of a person
19, 22, 25 starting distance
26, 27 minimum length of time
28 set level
29 maximum length of time
30 vibration profile prior to deviation
31 vibration profile during deviation
32 vibration profile following seat height re-adjustment
33, 34 upper and lower limit
35 asymmetric vibration profile
36 re-adjustment of the vibration profile
37 symmetric vibration profile
38, 40 electronic control unit
39 connector
41 reset unit
42 load relay
43 2/2 valve
44 3/2 valve
45 compressor
46 height adjustment
47 seat contact
48 driver unit
49 seat contact relay
50 Hall sensor
51 status LED

The invention claimed is:

1. Vehicle seat comprising at least one gas spring (9) which damps vibration and adjusts the seat height, said gas spring being arranged between a seat frame (1) and a base frame (2), and comprising a valve arrangement (43, 44) for adjusting the pressure in the gas spring (9) and a compressor (45) assigned to the vehicle seat (17, 20, 23), said compressor having a drive motor for feeding compressed air to the gas spring (9), wherein a belt roller device comprising a belt (11) rolled around an axle (12) is arranged between the seat frame (1) and the base frame (2), the first end (11a) of said belt being attached to a belt roller mechanism (10) arranged on the seat frame (1) and the second end (11b) of said belt being attached to the base frame (2), and a detector (16) which detects a belt rolling movement is attached to the seat frame (1), said vehicle seat being characterized by an electronic control unit (14, 38, 40) for evaluating belt rolling movement signals detected within a predefined time period (26, 27, 29) for determining a seat height profile within the time period (26, 27, 29) and for controlling the valve arrangement (43, 44) and/or the compressor (45) such that automatic, time-delayed seat height re-adjustment takes place if the determined seat height profile (31, 35) lies out of a position of symmetry in relation to a predefinable mean seat height (28), wherein the belt roller mechanism (10) is formed roller-like and has a magnetic strip (13) on the circumference, the individual positions of which can be detected by a detector (16) which is fitted in a stationary manner on the seat frame.

2. Vehicle seat according to claim 1, characterized by an arrangement (47, 49) for detecting occupancy of the seat, which arrangement transmits seat occupancy signals to the electronic control unit (14, 38, 40).

3. Vehicle seat according to claim 1, characterized in that the predefined time period (26, 27, 29) is a minimum length of time (26, 27) in which the vehicle seat (17, 20, 23) is unoccupied.

4. Vehicle seat according to claim 3, characterized in that the minimum length of time (26, 27) is 7 seconds or more.

5. Vehicle seat according to claim 3, characterized in that the electronic control unit (14, 38, 40) comprises a first actuator arrangement which, following expiry of the minimum length of time (26, 27), controls the valve arrangement (43, 44) and/or the compressor (45) for seat height re-adjustment such that the vehicle seat (17, 20, 23) is adjusted from below to the predefined mean seat height (28) independently of a weight of a person occupying the vehicle seat (17, 20, 23).

6. Vehicle seat according to claim 1, characterized in that the predefined time period (26, 27, 29) is a maximum length of time (29) in which during travel a weight displacement by a person occupying the vehicle seat (17, 20, 23) or an undesirable pressure change within the gas spring (9) takes place.

7. Vehicle seat according to claim 6, characterized in that the maximum length of time (29) is 10 seconds or less.

8. Vehicle seat according to claim 6, characterized in that the electronic control unit (14, 38, 40) comprises a second actuator arrangement which, following expiry of the maximum length of time (29), controls the valve arrangement (43, 44) and/or the compressor (45) for seat height re-adjustment such that a height vibration movement of the vehicle seat (1) as seat height profile (32) takes place symmetrically around the mean seat height (28).

9. Vehicle seat according to claim 1, characterized in that the predefined time period (26, 27, 29) is a further length of time in which during travel the seat height profile (35) as vibration profile of a height vibration movement of the vehicle seat (17, 20, 23) is subjected to an asymmetrical shift with respect to the predefinable mean seat height (28) on account of a road condition and/or a manner of driving and/or a weight loading condition of the vehicle.

10. Vehicle seat according to claim 9, characterized in that the electronic control unit (14, 38, 40) comprises a third actuator arrangement which, following expiry of the further length of time, controls the valve arrangement (43, 44) and/or the compressor (45) for seat height re-adjustment such that the predefined mean seat height (28) is re-adjusted.

* * * * *

UNITED STATES PATENT AND TRADEMARK OFFICE
CERTIFICATE OF CORRECTION

PATENT NO. : 7,575,206 B2 Page 1 of 1
APPLICATION NO. : 10/994134
DATED : August 18, 2009
INVENTOR(S) : Johann Meier, Thomas Burger and Marco Hofmann It is certified that error appears in the above-identified patent and that said Letters Patent is hereby corrected as shown below:

On the Title Page (Item 75), for inventor Thomas Burger, please replace the city of residence as follows:

from "Lubburg"

to -- Nabburg --

Signed and Sealed this

Twenty-fourth Day of November, 2009

David J. Kappos
*Director of the United States Patent and Trademark Office*